US006585404B2

(12) United States Patent  
Barton et al.

(10) Patent No.: US 6,585,404 B2  
(45) Date of Patent: Jul. 1, 2003

(54) FULLY AUTOMATIC ELECTRONIC MILKSHAKE MIXER

(76) Inventors: John C. Barton, 2807 Superior Ave., Middletown, OH (US) 45044; Norma J. Barton, 2807 Superior Ave., Middletown, OH (US) 45044

( * ) Notice: Subject to any disclaimer, the term of this patent is extended or adjusted under 35 U.S.C. 154(b) by 86 days.

(21) Appl. No.: 09/853,413

(22) Filed: May 11, 2001

(65) Prior Publication Data

US 2002/0167861 A1 Nov. 14, 2002

(51) Int. Cl.[7] ............................... B01F 7/26; B01F 9/18
(52) U.S. Cl. ...................... 366/142; 366/200; 366/206; 366/224; 366/601
(58) Field of Search ............................... 366/142, 200, 366/206, 213, 218, 224, 601

(56) References Cited

U.S. PATENT DOCUMENTS

| 967,003 | A | * | 8/1910 | Dickson | |
|---|---|---|---|---|---|
| 1,465,629 | A | | 8/1923 | Gilchrist | .................... 366/197 |
| 1,814,974 | A | * | 7/1931 | Snider | |
| 2,300,542 | A | * | 11/1942 | Forse | |
| 2,510,934 | A | * | 6/1950 | Schildknecht | |
| 2,550,281 | A | * | 4/1951 | Martin | |
| 3,224,743 | A | * | 12/1965 | Freedman | |
| 4,152,079 | A | | 5/1979 | Raitt | .......................... 366/155 |
| 4,750,844 | A | | 6/1988 | Stevenett | .................... 366/197 |
| 4,802,407 | A | * | 2/1989 | Negri et al. | |
| 4,822,172 | A | | 4/1989 | Stottmann | .................... 366/142 |
| 5,150,967 | A | | 9/1992 | Neilson et al. | ............. 366/206 |
| 5,439,289 | A | * | 8/1995 | Neilson | |
| 5,730,525 | A | | 3/1998 | Browne | ....................... 366/197 |
| 5,860,736 | A | | 1/1999 | Brisard | ......................... 366/94 |
| 5,912,039 | A | | 6/1999 | Browne | ....................... 426/565 |
| 5,957,578 | A | | 9/1999 | Holbrook et al. | ........... 366/197 |
| 6,065,861 | A | | 5/2000 | Chen | ........................... 366/144 |
| 6,126,983 | A | | 10/2000 | Miller | ......................... 426/565 |

\* cited by examiner

Primary Examiner—Charles E. Cooley  
Assistant Examiner—David Sorkin

(57) ABSTRACT

A fully automatic electronic milkshake mixer (10, FIG. 1) in which an operator sets scoop dial control (34, FIG. 1), based upon the number of scoops of ice-cream or related products placed in mixer cup. The mixer cup (28, FIG. 2) rotates automatically by motorized lower drive wheels (48, FIG. 1), and a top cup rim container guide/wheel assembly (54, FIG. 1) engages mixer cup upper lip (56, FIG. 2). Different sized mixer cups rotate perfectly, for faster, more complete mixing. The mixer automatically shifts from low to high speed (anti-splash feature), and turns off automatically when milkshake is done. A "ready" light (42, FIG. 1) illuminates, and a chime (68, FIG. 3) sounds—volume control and on/off being adjustable. "Manual" momentary pushbutton (32, FIG. 1) allows manual control of mixing speed and time, if desired, while cup rotates. For next milkshake, electronic mixer returns to fully automatic mode.

44 Claims, 8 Drawing Sheets

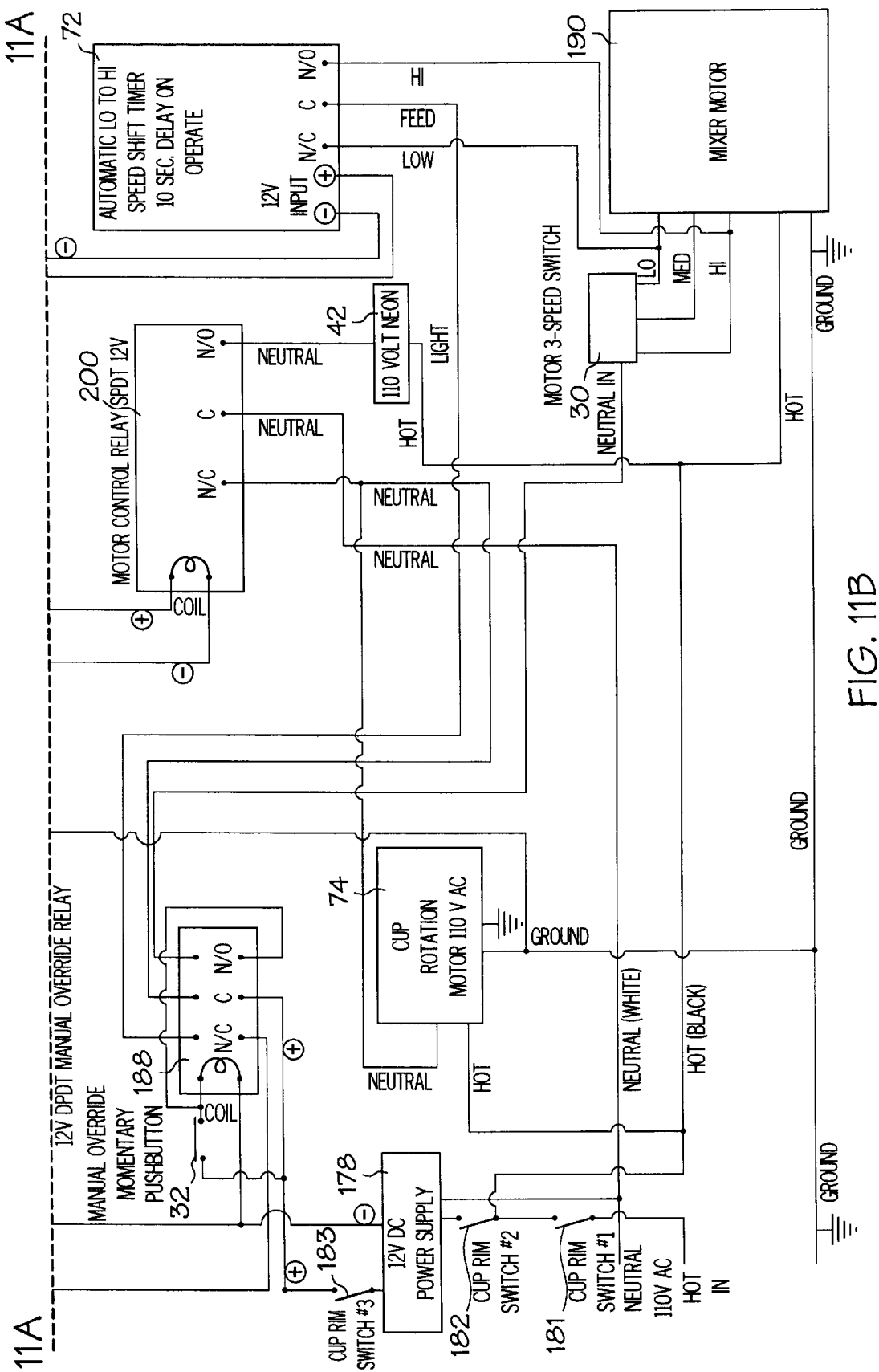

FULLY AUTOMATIC ELECTRONIC MILKSHAKE MIXER

BACKGROUND OF THE INVENTION

1. Field of the Invention

The present invention relates to a milkshake mixing machine, and more particularly to a milkshake mixing machine for automatically mixing milkshakes to a properly thick consistency. More particularly, the present invention relates to a fully automatic electronic milkshake mixer that serves to minimize the need for operator attention to obtain consistent, quality, fully mixed milkshakes of different sizes incorporating different numbers of scoops of ice-cream and related products.

2. Description of the Related Art

Various forms of mixing devices for making milkshakes have been available for some time. However, those devices require constant operator attention to change mixer speed, as well as observing when the milkshake is done in order to remove the cup. Since the number of scoops of ice-cream that are added to make a milkshake can vary considerably for different sized shakes, operator attention is required in order to obtain a desirable final milkshake consistency. Much manual attention must be given to insure that the ice-cream is fully mixed within the shake, and that the milkshake is not over-mixed to an undesirably thin, runny consistency. The greatest problem can be summed up as lack of quality control.

If a customer desires a milkshake having only one scoop of ice cream, the required mixing time is very brief on low speed setting. The operator is required to remain at the machine so that the milkshake is not over-mixed. When two, three, or four scoops of ice-cream are to be utilized to make a milkshake, longer mixing times are required, and mixing speed must start on low to avoid a cascade of milkshake flying out of the mixer cup. Then mixer must be switched to high speed to finish the mixing process completely.

When milkshakes are begun at high speed, the entire mixer backdrop, soda fountain work counter, and the operator get immediately splashed—necessitating an unnecessary huge cleanup. The operator must pay close attention to avoid over-mixing the shake—which results in irate customers who paid a lot of money only to receive a poor product.

Soda fountain personnel commonly use many tricks in an attempt to make milkshakes mix faster and more completely: jiggling the mixer cup, turning the cup by hand, and squeezing the double poly mixer cups. Often, spoons are inserted into the cup to push floating ice-cream clumps (wedged between the smooth agitator spindle and the cup) down to be mixed by the agitator. Also, removing the cup, rotating it, and putting it back on the mixer is often used to achieve the same purpose. Many times, the milkshake is over-mixed for long periods of time in an attempt to dislodge and mix these floating clumps of ice cream; thin, watery, over-beaten shakes are the result.

Needless to say, all the above tedious manual maneuvers result in tired, exhausted personnel after many hours of making milkshakes; job productivity is lost. Since the same employees usually have other customers to attend to and other duties to carry out, if they do not closely monitor the milkshake mixer, the resulting product will not be of the desired thick consistency.

Many times, huge amounts of ice-cream are put into the cup because the clerk knows that they won't be able to remove the shake from the mixer while attending to the cash register etc. Longer mixing times result in wasted electricity, unnecessary mixer wear and tear, increased ice-cream cost, and lower owner's profits. Even then, invariably the milkshake will be left mixing so long as to be like water. This results in the worst loss of all—the loss of business, as customers will not return. It is an object of the present invention to provide an automatic electronic milkshake mixer; one that is capable of fully automatic operation, without operator attention, that is capable of providing uniformly thick, quality milkshakes regardless of number of scoops in various sized shakes.

SUMMARY OF THE INVENTION

The present invention is a fully automatic electronic milkshake mixer. Briefly stated, in accordance with one aspect of the present invention, a mixing machine for mixing milkshakes and related products is provided. The mixer includes a support structure in the form of a base and an upwardly-extending backdrop member connected to the base. At the top of the backdrop, is located a motor head from which a spinning agitator extends toward the base for mixing milkshakes. The mixer cup is supported in a substantially upright position so that the agitator extends down into the cup. The cup support structure includes a mixer cup drive for engaging a mixer cup base and for rotating the cup relative to the agitator during a mixing operation.

In accordance with another aspect of the present invention, a top cup rim container guide/wheel assembly is provided for guiding rotational movement of the upper rim of the mixer cup—as it is being driven by the drive wheel arrangement that operates on the lower rim of the mixer cup.

In accordance with a further aspect of the present invention, a milkshake mixer is provided that includes a scoop dial control that can be set based upon the number of scoops of ice-cream placed in the milkshake cup.

In accordance with a still further aspect of the present invention, a milkshake mixer is provided that includes an anti-splash feature which prevents milkshake from flying out of the mixer cup and onto the operator, mixer, or work counter due to mixer being started on too high of a mixing speed. The milkshake mixer starts mixing on low speed and automatically shifts to high speed.

In accordance with an even further aspect of the present invention, a milkshake mixer is provided that is capable of automatically mixing milkshakes based upon selected numbers of scoops of ice-cream and without further operator attention, and that provides an audible (chime) and visual ("ready" light) signal to indicate to the operator the milkshake is done, as the mixer turns itself off.

In accordance with a yet further aspect of the present invention, a milkshake mixer is provided with a "manual" momentary pushbutton. This allows the operator manual control over mixer motor speed and length of mixing time. During manual operation, mixer cup still rotates automatically for faster, more complete mixing. The milkshake mixer automatically returns to fully automatic operation for the next milkshake.

DESCRIPTION OF THE PREFERRED EMBODIMENTS

Figure 1:
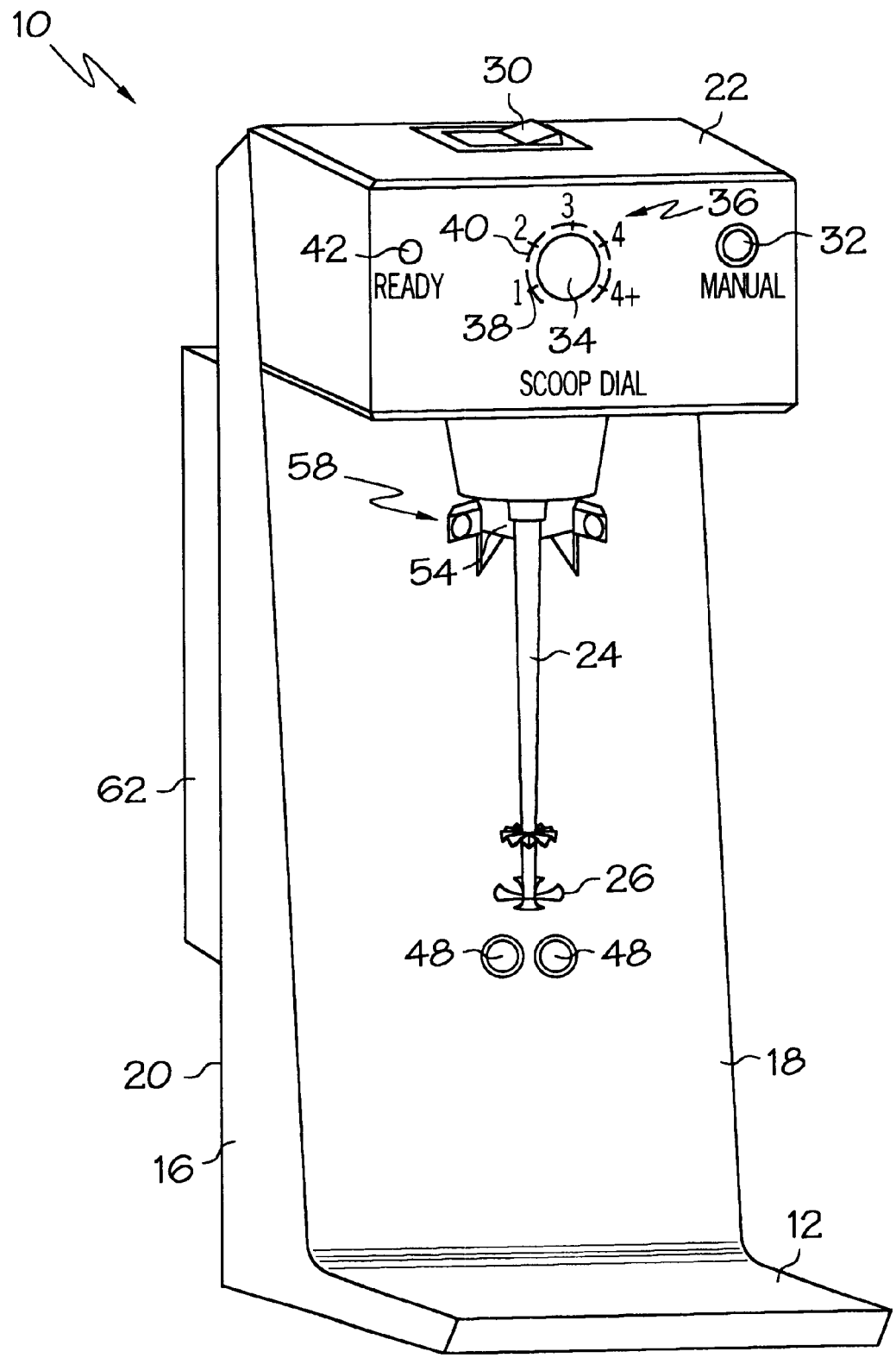
FIG. 1 is a front perspective view of an automatic electronic milkshake mixer in accordance with the present invention.
Figure 2:
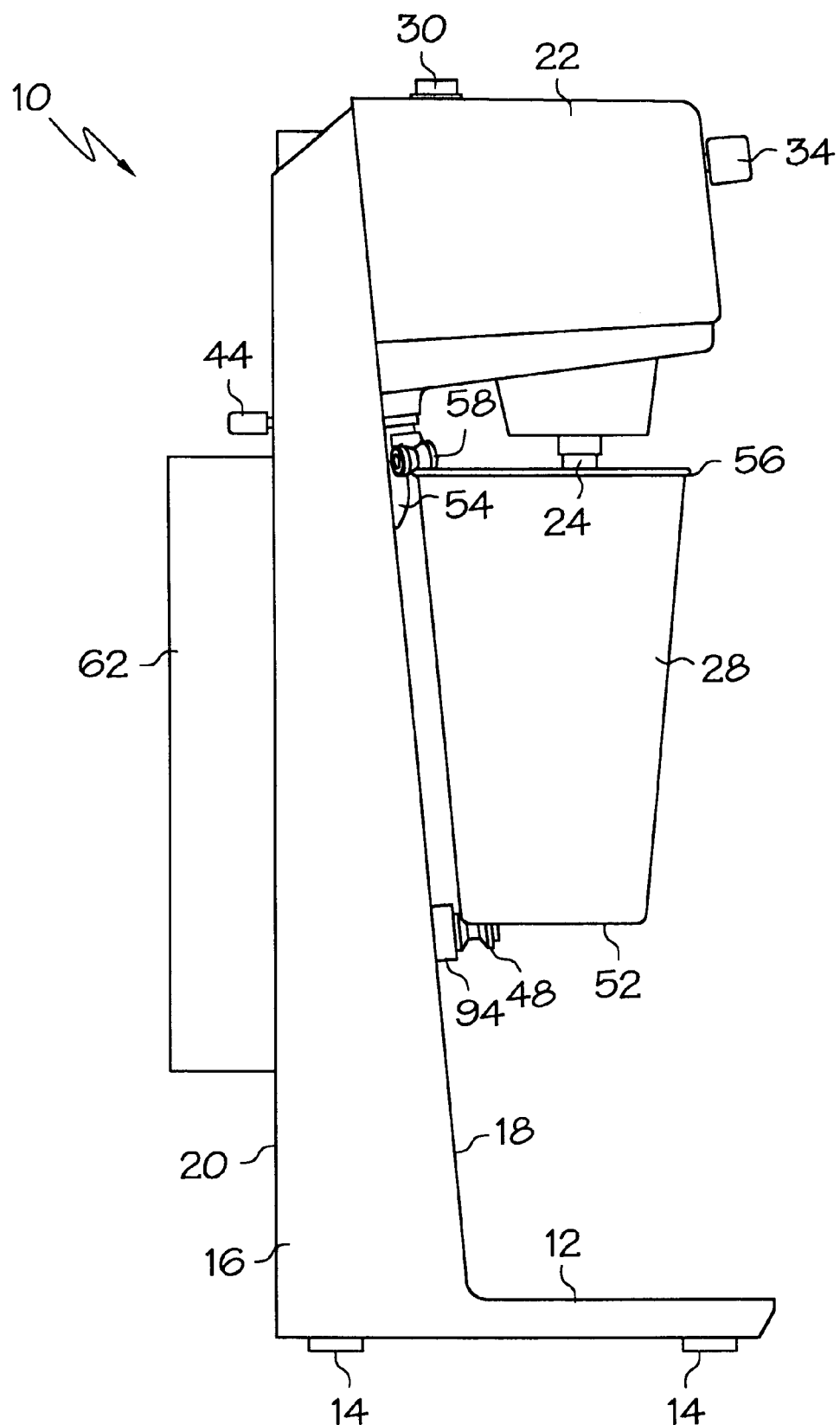
FIG. 2 is a side elevational view of the automatic mixer shown in FIG. 1 with the mixer cup in operative position for mixing a milkshake.

Referring now to the drawings, and particularly to FIGS. 1 and 2 thereof, there is shown an automatic electronic milkshake mixer 10 in accordance with the present invention. The length of mixing time is controlled by a scoop dial control knob 34 (set for the number of scoops of ice cream) on a mixer motor head 22. The mixer shifts speed automatically (anti-splash feature), rotates a mixer cup 28 (in the same direction as a mixer agitator 24—clockwise as looking down from top), turns itself off at the proper milkshake consistency, and alerts the operator that the milkshake is done—with a "ready" light 42, and a chime 68 (see FIG. 3) as set forth below. Pushing a "manual" momentary pushbutton 32 allows manual milkshake mixer operation (with motorized cup rotation) for that particular milkshake only, with the mixer automatically returning to automatic mode for next shake.

Mixer 10 includes a base 12 to which are attached a number of rubber feet 14 (see FIG. 2), and it also includes a substantially upright, unitized, reinforced, rear mixer backdrop 16. Rear mixer backdrop 16 inner cavity is covered by a rearwardly slanted stainless steel mixer front backdrop 18, and has a vertical rear wall 20. Rear unitized mixer backdrop 16 has at its uppermost end motor head 22 for housing the milkshake mixer motor. Agitator spindle 24 extends down from motor head 22 and terminates in an agitator 26 that mixes ingredients, such as milk and ice-cream, that are placed in mixer cup 28. This cup is supported by a pair of lower drive wheels 48 and an upper container rim guide/wheel assembly 54. A mixer motor switch slide mechanism (not shown—in cavity of rear mixer backdrop 16 behind cup rim container guide/wheel assembly 54) is pulled downward by a return tension spring (not shown). The spring has the approximate following properties to pull a pair of top cup container rim guide wheels 58 down onto a mixer cup upper lip 56:

E 6.35 mm (¼ inch)(OD)×0.533 mm (0.021 inch) (wire)× 47.625 mm (1⅞ inch) (length)

rate (K)=0.0665 newtons/mm (0.38 lbs./in.)

initial tension (IT)=0.4448 newtons (0.100 lbs.)

Mixer cup 28 is stable and will not fall off, but excessive downward pressure is avoided. As best seen in FIG. 2, the axis of rotation of agitator spindle 24 is offset slightly from the longitudinal axis of mixer cup 28 into which the ingredients to be mixed are placed, which aids in promoting more uniform mixing. The offset is in a direction away from mixer front backdrop 18. Motor head 22 includes on its uppermost surface a manually operated motor speed control switch 30, which is a three position rocker switch corresponding with low, medium, and high mixer motor speeds. The speed of the mixer motor can be selected by the operator if "manual" momentary pushbutton 32 is pushed after milkshake cup 28 is put on the mixer (should operator wish manual operation for any reason). In normal automatic operation, manual rocker speed switch 30 can be in any position—it is disconnected and will not affect automatic operation.

Scoop Dial

Inside motor head 22 is a scoop dial potentiometer 192 (see FIG. 11) to which is attached control knob 34. The front surface of motor head 22 includes a circular scale 36 (for numbers of ice-cream scoops in shake), around control knob 34 to vary the mixing time during automatic operation of the milkshake mixer. The operator need not be concerned with timing—but only numbers of scoops, as this is all that is labeled on the dial to prevent confusion.

The scale includes the numbers 1, 2, 3, 4, and 4+, which denote numbers of scoops. Adjacent to each scale number is a corresponding mark 38. Simply turn scoop dial knob 34 to the corresponding mark for that particular number of ice-cream scoops. On each side of each mark 38, there is a curved line 40 that indicates a range for that number of ice-cream scoops. A setting slightly to the left of the number is chosen if the scoops are slightly smaller, or to the right of the number if the scoops are slightly larger than average. (This translates into a lesser or greater mixing time). Although the scale is shown as having discrete numerical increments, the scoop dial control potentiometer has continuously operating uninterrupted movement from below the 1 scoop position to above the 4+ scoop position—for very large milkshakes.

Simply set scoop dial 34, put milkshake mixing cup 28 on the mixer, and walk away—allowing the fully automatic electronic milkshake mixer to do all the work for you.

Scoop Dial Settings

At the lower left of the scoop dial, a small one scoop setting of approximately 10 seconds is the minimum time of running. This is perfect for diet shakes if a person did not want all of the calories that more ice-cream (or sherbet etc.) would contain. This minimum setting is low speed only, since the mixer turns off right before the speed shifts to high. Therefore, this very small shake will not be over-beaten.

A typical—slightly larger—1 scoop of ice cream=15 seconds total operating time (10 seconds of low speed and 5 seconds of high speed). A shake with 2 scoops of ice cream=25 seconds total operating time (10 seconds of low speed and 15 seconds of high speed). A shake with 3 scoops of ice cream=35 seconds total operating time (10 seconds of low speed and 25 seconds of high speed). A shake with 4 scoops of ice cream=45 seconds total operating time (10 seconds of low speed and 35 seconds of high speed). A shake with 4+ scoops of ice cream=50 seconds total operating time (10 seconds of low speed and 40 seconds of high speed). If the scoop dial control knob is turned completely clockwise (to the lower right of the dial beyond the 4+ scoop position), the mixer will operate for the maximum time of approximately 55 seconds (10 seconds of low speed and 45 seconds of high speed).

The above settings provide optimum mixing results for the various numbers of scoops in different sized milkshakes. Because the scoop dial is a continuous movement potentiometer control, any setting—even between scoop numbers can be chosen. The typical 3½ oz. scoop of ice cream (#16 scoop size—generously rounded on top with ice cream) is used for calibration of these scoop dial markings. On all positions of scoop dial knob 34, low speed of 10 seconds is an anti-splash feature, to avoid massive overflow of milkshake out of the cup as large clumps of ice-cream are hurled into the agitator when the shake is first put on the mixer. Then the mixer automatically shifts to high speed (time dependent on scoop dial knob 34) for perfect, fast mixing of ingredients—even sticky ingredients such as liquid peanut butter or chocolate syrup.

Various Standard Mixer Cup Sizes Used standard stainless steel milkshake mixer cups—usually 3 scoops of ice cream 16 oz. double poly cups—2 scoops of ice cream. "Sweetheart" brand RP16 cups with "Solo" brand stainless steel 16 OZ. shake collar model #168SC to make cup height the same as the other cups.

24 oz. double poly cups—3 scoops of ice cream. "Sweetheart" brand RP24 cups.

32 oz. double poly cups—4 scoops of ice cream. "Sweetheart" brand RP32N cups.

Alternate compositions of similarly sized cups may be used.

Milkshake Completion Indicators

Milkshake mixer 10 also provides indications to the operator that an automatically controlled mixing operation is complete. One such completion indicator is a visual signal in the form of neon "ready" light 42 that is provided on the front surface of motor head 22, and lights when the milkshake is done mixing. "Ready" light 42 remains lit until the mixer cup is removed from the mixer. A neon rather than incandescent lamp was chosen, so that there is no filament to break, due to mixer motor head vibration.

Figure 3:
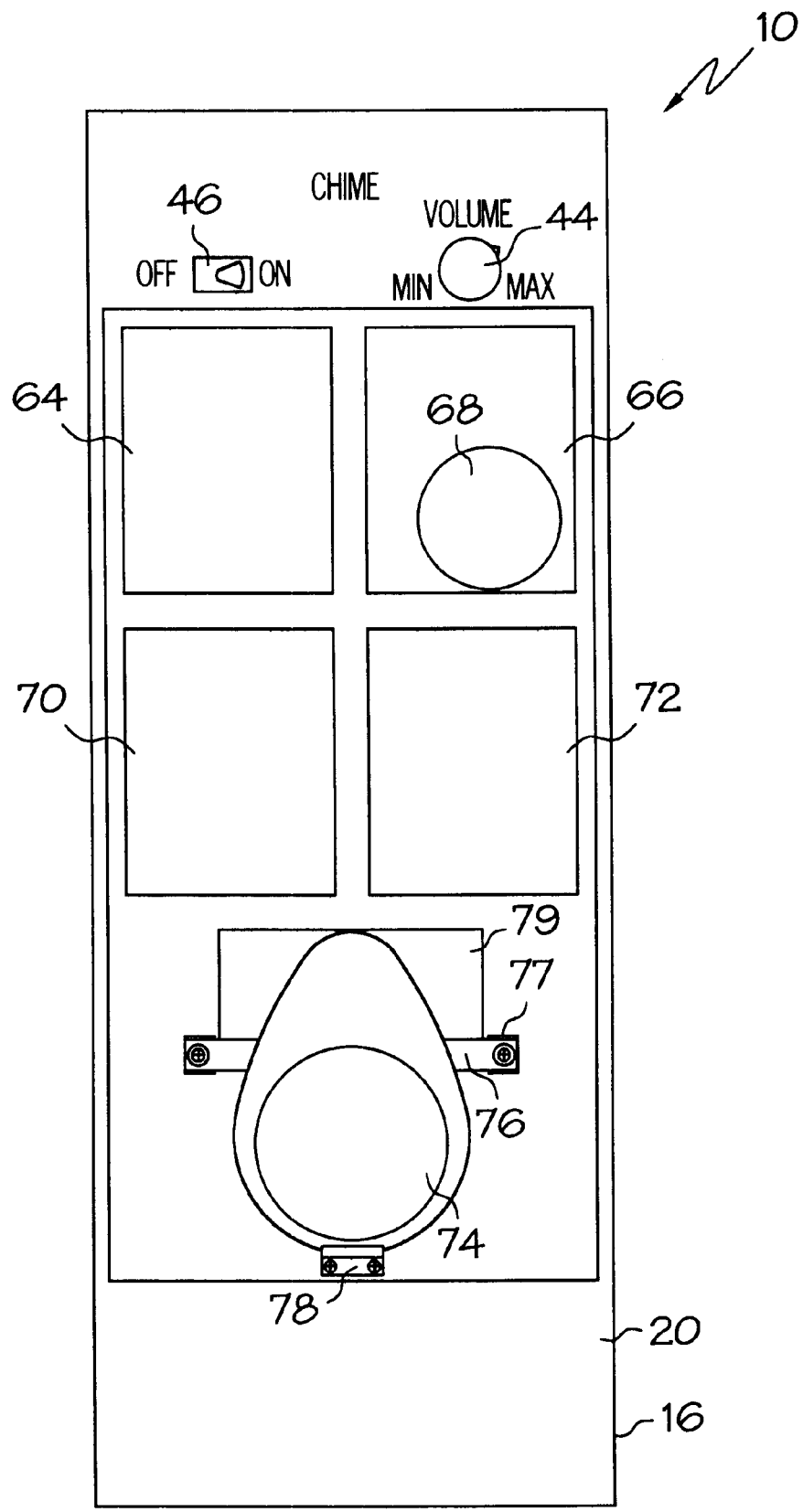
FIG. 3 is a rear view of the mixing machine shown in FIG. 1 with the rear control housing cover removed to show the various mixer cup drive and electronic control elements.

Another completion indicator is an audible signal in the form of pleasing two-tone chime 68 (see FIG. 3). A chime volume control 44 is provided on rear wall 20 of rear mixer backdrop 16 to allow the operator their choice in chime sound level. A minimum volume control stop keeps an operator from inadvertently turning volume knob 44 too low to be heard. Additionally, a chime on/off switch 46 is provided so that the operator can turn off the chime if desired. Thus, when the mixing operation is completed, there is an audible signal as well as a visual signal. This is very important if the operator is busy with other tasks across the room. The "ready" light is important to tell the operator which shake is done if several are mixing at the same time on a triple mixer—or even several single or triple mixer units.

Mixer Cup Rotation

As shown in FIGS. 1 and 2, mixer 10 also includes a pair of laterally spaced lower drive wheels 48, that are adapted to engage lower rim 52 of mixer cup 28, and to support it vertically during the mixing operation. The cup rotation mechanism keeps the same spatial relationships between cup and mixer, as regularly found in milkshake mixers. In conventional mixers, the mixer cup lower supports are stationary stainless support buttons mounted to mixer front backdrop 18, with anchoring screws going back through a recess well 79 (see FIG. 3) in rear mixer backdrop 16. In the new automatic milkshake mixer in accordance with the present invention, two lower drive wheels 48 are motorized, causing mixer cup 28 to rotate relative to the axis of agitator spindle 24 for faster and more complete mixing.

The direction of rotation of mixer cup 28 is in the same direction of rotation of agitator spindle 24; the vortex motion of milkshake helps to assist in the rotation of the mixer cup. Additionally, because of the lateral offset between the axis of agitator spindle 24 and the longitudinal axis of mixer cup 28, the entire contents of the mixer cup is exposed to the agitator as the mixer cup rotates causing complete mixing of the mixer cup contents.

As best seen in FIG. 1, top cup rim container guide/wheel assembly 54 is situated on front stainless mixer backdrop 18 to engage upper rim 56 of mixer cup 28. Cup rim guide 54 is slidable in an upward direction along front mixer backdrop 18 to operate an internal switch slide assembly (not shown—in area behind front backdrop 18), that turns mixer 10 on when the mixer cup is placed on mixer. Cup rim guide 54 also carries two laterally spaced top cup container rim guide wheels 58, that engage cup upper rim 56 to allow stable, smooth, easy rotation of the various standard mixer cup sizes.

A rear cover 62 (FIG. 1) screws to rear wall 20 of rear unitized mixer backdrop 16. (See FIG. 3). A cup rotation motor 74 and a set of four electronic modules 64, 66, 70, and 72 are located behind cover. These modules could also be combined on one circuit board, should a manufacturer desire to do so.

Cup rotation motor 74 is supported by a horizontal motor support bracket 76, and a small lower bracket 78. Cup rotation motor 74 is a "Hurst" brand, 110 v AC continuous duty instrument gearmotor #3006-013 model AB, with all hardened gears. Horizontal motor bracket 76 has a pair of angled spring clips 77 (see FIG. 3) beneath ends of bracket, to angle motor 74 rearward in order to maintain a perpendicular relationship with mixer front backdrop 18. A set of rubber anti-vibration cushions (not shown) are located beneath spring clips 77 and beneath lower support bracket 78.

Cup Rotation Drive Mechanism

Figure 7:
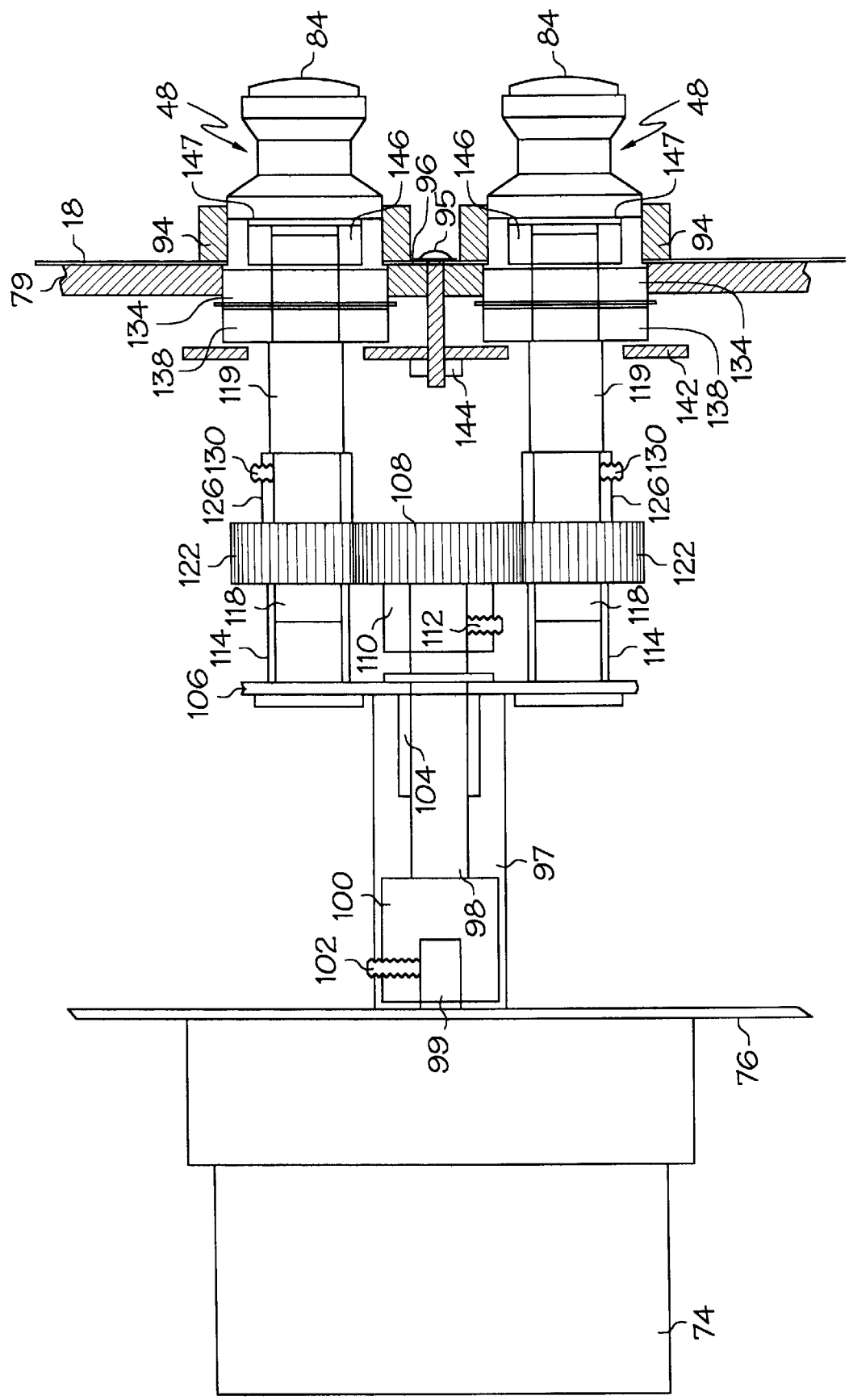
FIG. 7 is a top view of a milkshake mixer cup drive system in accordance with the present invention, for rotating a mixer cup relative to the mixer agitator.

Cup rotation motor 74 drives lower drive wheels 48 through the drive train illustrated in FIG. 7. Drive train components are located in recess well 79 of rear mixer backdrop 16.

With the following milkshake cup rotation mechanism design, all standard milkshake mixer cup sizes rotate perfectly. There is no instability, no falling off of cups, and no slippage or binding even over cup seams or irregularities. Mixer cup rotation operates perfectly even if wheel surfaces are wet.

Figure 4:
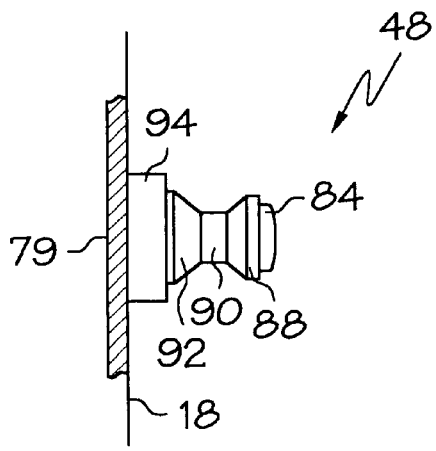
FIG. 4 is a side view of a lower cup drive wheel in accordance with the present invention for rotating a milkshake mixer cup relative to the milkshake mixer agitator.
Figure 5:
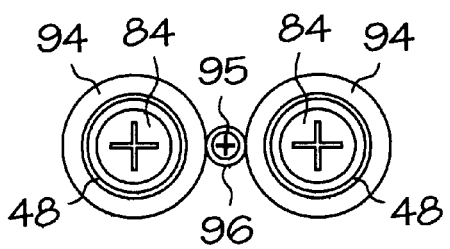
FIG. 5 is a front view of a pair of lower cup drive wheels for rotating a milkshake mixer cup relative to the mixer agitator.
Figure 6:
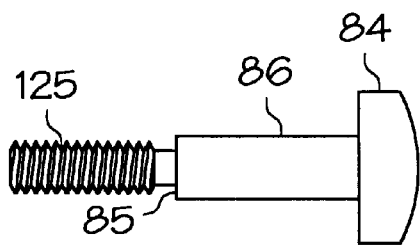
FIG. 6 is a side view of a drive wheel mounting screw for the lower cup drive wheels shown in FIGS. 4 and 5.

Rotation of mixer cup 28 is caused by two lower drive wheels 48. A side view of one of lower drive wheels 48 is shown in FIG. 4. FIG. 5 shows a front view of these drive wheels as they appear in front of stainless front mixer backdrop 18. FIG. 6 shows side view of one of a pair of stainless steel mounting screws 84. The screws are Phillips, pan head style with the head diameter machined down to about 10.617 mm (0.418 inch). This makes the screw head slightly smaller in diameter than a beveled front half 88 of drive wheel 48, to avoid screw head contact with the bottom of stainless milkshake mixer cups. Length of screws is about 28.575 mm (1⅛ inches). A smooth shoulder 86 of about 5.283 mm (0.208 inch) diameter and about 15.875 mm (⅝ inch) in length is provided on screws 84, on which the drive wheels seat. ¹⁰⁄₃₂ left hand threads about 12.7 mm (½ inch) in length are provided so that rotation of the drive wheels against mixer cup lower rim 52 does not cause unscrewing of the drive wheel mounting screws as the mixer cup rotates. As an alternative to machining, these screws could be molded if desired. The two lower drive wheels are identical and it will therefore be understood that the following description pertains to both wheels.

As best seen in FIG. 4, drive wheel 48 includes a beveled front half 88, a spacer 90, and a beveled rear half 92. As shown, drive wheel 48 has an hourglass type of shape with a center recess that receives mixer cup lower rim 52. Drive wheel 48 can be a one-piece molded structure of a rubber or neoprenized type of material, to provide frictional engagement with mixer cup lower rim 52, and thereby assure a positive drive. In the present embodiment of this invention, drive wheels 48 consist of the several individual elements shown in FIG. 4.

Front drive wheel half 88 is a size 000 beveled "Danco" brand faucet washer. Spacer 90 is an automotive rubberized type vacuum hose about 3.175 mm (⅛ inch) in length, about 5.556 mm (⁷⁄₃₂ inch) O.D. and about 2.778 mm (⁷⁄₆₄ inch) I.D. Rear drive wheel half 92 is a slightly larger diameter (for cup stability) size 00 beveled "Danco" brand faucet washer. Mounting screws 84 are easily unscrewed from the front of the mixer for rubber parts replacement—with no additional disassembly of the mixer required. Simply slide on new rubber parts 88, 90, and 92 onto existing stainless wheel mounting screws 84; these rubber parts stretch slightly when pushed onto screw shoulder 86 for a no-slip fit.

A spacer 146 (FIG. 7) seats on a front bearing unit 134 race and on a stainless washer 147 bonded to the back side of rear half 92 of drive wheel 48. When screws 84 are installed, the above parts act to very slightly squeeze rubberized drive wheel pieces 88, 90, and 92—both for stability and to prevent any slippage.

To accommodate the round shape and different diameters of the various standard mixer cups, the beveled angles on each of front half 88 of drive wheel and rear half 92 of drive wheel are at an angle of about 45°-relative to center spacer 90. Positioned between drive wheels 48 and the face of front stainless mixer backdrop 18 are a pair of round nylon splatter shields 94 (FIG. 5). Each splatter shield 94 axially receives the rear portion of rear half 92 of drive wheel; a very close tolerance between these parts prevents any liquids from entering front bearing units 134 (see FIG. 7). Splatter shields 94 are sealed to stainless mixer backdrop 18.

Splatter shields 94 are perpendicularly mounted to front stainless mixer backdrop 18 (FIG. 2), and due to the rearward slant of backdrop 18, the top surface of shields 94 slants rearwardly also. Liquids running down stainless mixer backdrop 18 will therefore be channeled around splatter shields 94, instead of flowing down over lower drive wheels 48.

As shown in FIG. 5, a stainless retaining screw 95 with a stainless washer 96 (between lower drive wheels 48) extends through front stainless mixer backdrop 18, and screws into a bearing support plate nut 144 (see FIG. 7) on the rear of a bearing support plate 142. This support plate holds in place front and rear ball bearing units 134 and 138, which support a pair of 6.35 mm (¼ inch) diameter driven stainless steel shafts 118. Drive wheel mounting screws 84 screw into ends of driven shafts 118. Each screw 84 has a machined shoulder edge 85 to seat against the driven shaft ends for a perfectly true rotation of lower drive wheels 48. (See FIG. 6). For proper operation of the various standard mixer cup sizes and diameters, wheel mounting screws 84 are about 26.194 mm (1¹⁄₃₂ inch) center to center.

The drive arrangement for the lower drive wheels (FIG. 7) shows a top view of the cup rotation drive system. The following mechanical design is extremely durable for constant heavy-duty commercial use. Cup rotation motor 74 operates at 1 rotation per second. This causes lower drive wheels 48 to rotate at a slightly faster rate, due to a drive gear 108 being slightly larger in outer diameter than a pair of driven gears 122. The resulting mixer cup rotation is fairly slow but steady. A faster cup rotation would hurl ice-cream clumps into the mixer agitator faster than the agitator could handle them. This would result in splashing of milkshake out of the mixer cup.

A drive shaft 98 is connected with a motor output shaft 99, and has an enlarged diameter drive shaft collar 100 that surrounds and is secured to a flat in motor output shaft 99, by a set screw 102. Drive shaft 98 is supported in a bronze bushing 104 that is mounted in a bronze bushing support plate 106. This bronze bushing support plate incorporates three grease impregnated bronze bushings that keep drive shaft 98 and two driven shafts 118 in perfect alignment at all times, for drive and driven gears to mesh correctly. Bushing support plate 106 is attached to cup rotation motor top horizontal cross bracket 76 by means of a perpendicular support 97.

Secured to the opposite end of drive shaft 98 is drive gear 108 that has a collar 110 containing a set screw 112 engaging the flat in drive shaft 98. Also mounted in bushing support plate 106 are a pair of bronze bushings 114, which support driven shafts 118 on which are mounted driven gears 122. Each of two driven gears 122 includes a collar 126 and a set screw 130, to engage flats in driven shafts 118. Two driven shafts 118 have enlarged segments 119 which serve as shoulder stops for driven gear collars 126 on one end, and rear ball bearing units 138 on the other end. Driven shafts 118 protrude through their respective holes in bearing support plate 142, and are each supported by front and rear ball bearing units 134 and 138.

The front ball bearing units are "Fafnir" brand flanged #FS1KDD7, and the rear ball bearing units are "Fafnir" brand non-flanged #PS1 KDD7. In FIG. 7, stainless screw 95 goes through stainless front mixer backdrop 18, then through front of recess well 79 and finally through bearing support plate 142 with affixed nut 144. The flange of front bearing units 134 seats against front portion of recess well 79 (FIG. 7 and FIG. 3). Bearing support plate 142 is siliconed at each end to hold it and bearing arrangements in place, when screw 95 is removed. This allows front stainless backdrop 18 to be removed for servicing a 12 v DC power supply (not shown), cup rim switch slide mechanism (not shown), chime on/off switch 46, or chime volume control 44—without disturbing or disassembling any drive train components to the rear. This commercially used type of double bearing design is both stable and extremely durable for constant hard use. Driven shafts 118 are perpendicular to rearwardly slanted front stainless mixer backdrop 18.

Figure 8:
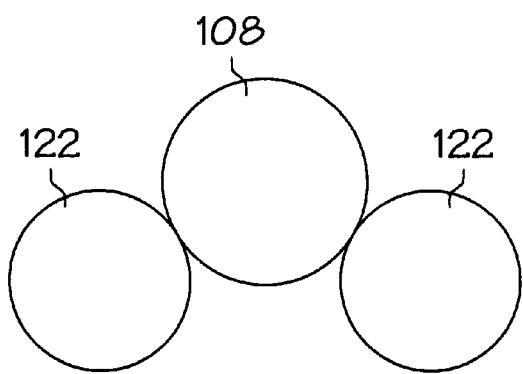
FIG. 8 is an end view of the positioning of the drive and driven gears for the mixer cup drive system shown in FIG. 7.

The relative positions of drive gear 108 and driven gears 122 are shown in an end view in FIG. 8. Drive gear 108 has a larger outer diameter than that of both identical driven gears 122. All three gears are "Martin" brand hard bar stock steel spur gears. The drive gear is #S2414-14½, and the two driven gears are #S2411-14½. Thus the gearing arrangement shown causes each of the two lower drive wheels 48 to rotate at the same speed in the same direction; they each contact the periphery of lower rim 52 of mixer cup 28, causing the cup to rotate in the same direction as the mixer motor agitator.

Top Cup Rim Container Guide/Wheel Assembly

Figure 9:
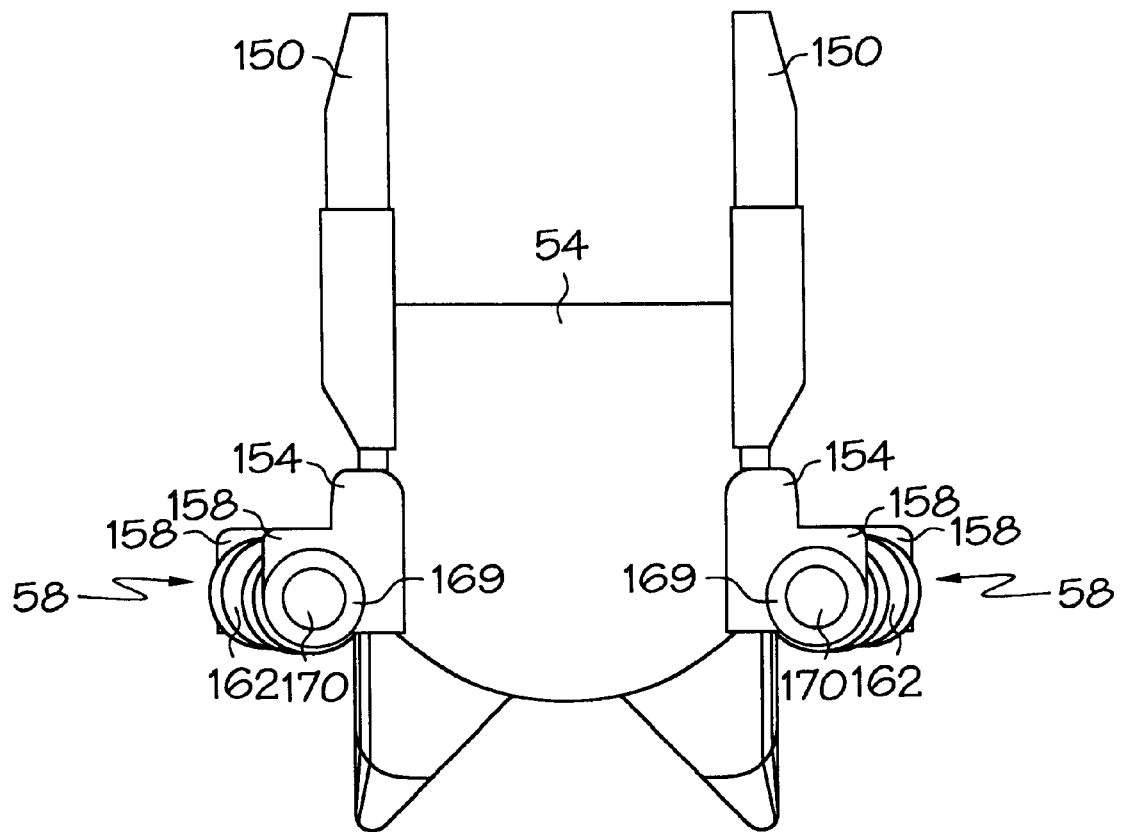
FIG. 9 is a front elevational view of a top cup rim container guide/wheel assembly that engages the cup rim switch slide mechanism.

Top cup rim container guide/wheel assembly 54 engages mixer cup upper rim 56 (see FIG. 2 and FIG. 9). Cup rim container guide 54 slides vertically upward into the rear of mixer motor head 22, with a pair of projections 150 engaging the cup rim switch slide mechanism (not shown), behind mixer front stainless backdrop 18. This slide switch mechanism has an upward travel limit (PVC hose style bumper) around the top mounting support of switch slide assembly (not shown). This allows foolproof, easy placement of cup on mixer, with cup upper rim and lower edge always seating correctly on the wheel surfaces.

This switch slide mechanism turns on the electronics, cup rotation motor, and milkshake mixer motor, when the milkshake cup is put on the mixer. Fully automatic milkshake mixer operation will ensue as per setting of scoop dial knob 34 on front of mixer motor head 22.

Figure 10:
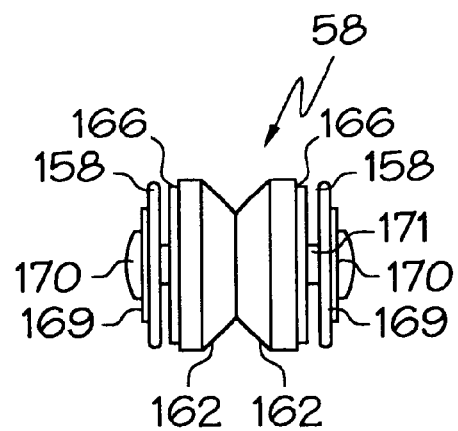
FIG. 10 is a side view of a top cup rim container guide wheel of the form utilized in the top cup rim container guide shown in FIG. 9.

Top cup rim container guide 54 includes a pair of angled guide wheel carriers 154 that extend laterally in an outward direction. In the present embodiment, guide wheel carriers 154 are aluminum to avoid rusting; however, these could be a one-piece molded plastic type of structure with top cup rim container guide 54. Each of guide wheel carriers 154 has perpendicular extensions, which are a pair of parallel support arms 158. Parallel support arms 158 are at an approximate angle of 32° relative to a plane parallel to the rear flat surface of top cup rim container guide 54. Each of support arms 158 rotatably supports a nylon axle 171 that carries upper guide wheel 58. FIG. 10 shows a side view of wheel 58, parallel to the guide wheel axle.

Upper guide wheels 58 each include inner and outer guide wheel halves 162 which are bonded together to form one wheel. This prevents the two halves from spreading apart (as they push down on mixer cup upper lip 56) and causing undue friction against parallel support arms 158. In manufacture, the two-part wheel assembly could be molded as one piece. When a milkshake cup is in operative position on the mixer, the beveled surface (about 45°) of each guide wheel half 162 contacts the inner or outer edge, respectively, of mixer cup upper lip 56. This design results in smooth cup rotation.

A thin nylon washer 166 is bonded to the outermost face of each guide wheel half 162 to reduce friction between the guide wheels and support arms 158. A pair of nylon axle end caps 170 push into ends of axle 171, to retain axle 171 in place. Upper guide wheels 58 are angularly oriented in such a way that standard mixer cups of varying sizes and diameters will rotate perfectly. A nylon washer 169 is bonded to each of the outer surfaces of parallel support arms 158, so that the nylon axle end caps contact them during rotation.

Top cup rim container guide/wheel assembly 54 pulls down and off of mixer motor head area for easy cleaning. It is lightweight, will not rust, can be cleaned with a sponge or pastry brush, and can be submerged in soap and water. If desired, the axle end cap can be removed (with a fingernail) from each wheel assembly—allowing the nylon axle to be pulled out of wheel 58. The wheel will then fall out for easy cleaning. Replace in reverse order, pushing nylon end caps 170 into the axle ends. In the present embodiment, two upper guide wheels 58 consist of "Danco" brand 00 size beveled faucet washers bonded together, but could be molded as one piece if desired. Faucet washer composition is safe around food and water, and is long wearing.

Electronics

Electrical connections are circuit board screw connector terminals on the four electronic modules and 12 v DC power supply. "Molex" brand pin plug connectors are used to attach wiring to cup rotation motor 74, cup rim switch slide mechanism (not shown), scoop dial control 34, "ready" neon indicator light 42, "manual" momentary pushbutton 32, and low to high speed automatic shift wiring. These quick connections make removal and servicing of these components fast and easy.

The four electronic control modules, cup rotation motor, and drive train are all located behind properly ventilated rear mixer cover 62 (see FIG. 2) attached to rear wall 20 of rear unitized mixer backdrop 16. FIG. 3 shows this cover removed. All relays and wires are rated for higher amperage than needed for these circuits.

Figure 11A:
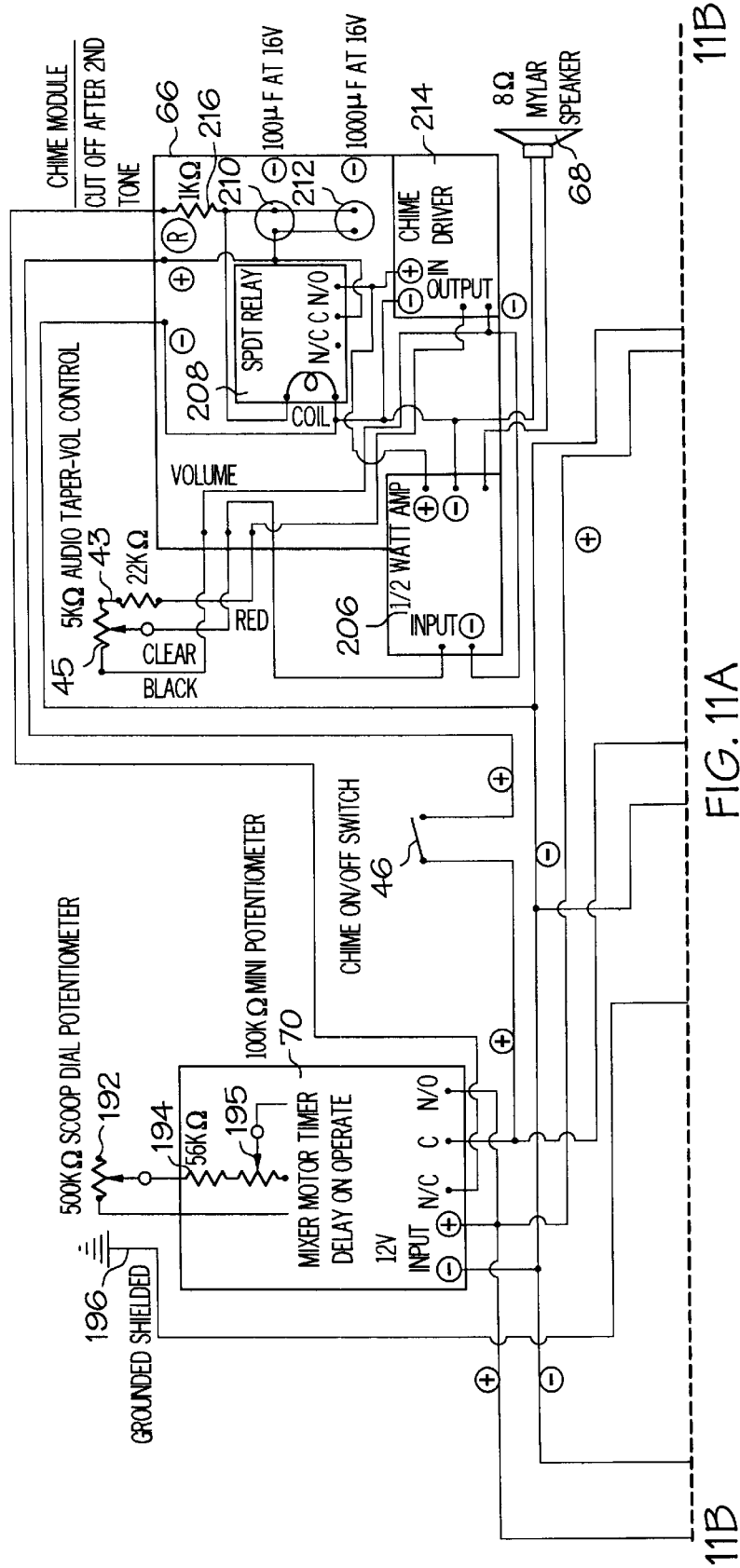
FIG. 11 is the schematic diagram showing wiring connections of mixer motor, cup rotation motor, and electronic components, for the fully automatic electronic milkshake mixer in accordance with the present invention.

For the following, refer to FIG. 3 for module location, and FIG. 11 for automatic electronic milkshake mixer schematic. Top left relay module 64 contains a mixer motor control relay 200, which turns off a mixer motor 190 and cup rotation motor 74, and turns on "ready" light 42 (when the milkshake is done and this relay energizes). When the milkshake cup is removed from the mixer, "ready" light 42 goes off as motor control relay 200 de-energizes. This motor control relay is SPDT –12 v DC.

Also on top left relay module 64 is a "manual" override relay 188. "Manual" momentary pushbutton 32 on the front of mixer motor head 22 is pushed by the operator after the milkshake cup is put on the mixer, if automatic mixer operation is not desired for any reason. "Manual" pushbutton 32 causes 12 v DC-DPDT manual override relay 188 to latch on for the duration of that milkshake cycle. This disconnects positive 12 v DC power to the electronics (preventing automatic operation), and disconnects 110 v AC neutral feed to the relay contact terminals of automatic low to high speed shift timer 72—at the same time neutral feed is connected to mixer motor 3-speed rocker switch 30 on top of the motor head. The user can thereby select mixer motor speed and cup rotation motor 74 will rotate cup (for fast, complete mixing); however automatic shutoff, automatic low to high speed shift, "ready" light, and chime will not operate. The milkshake mixer automatically returns to automatic operation for the next shake.

Top right module 66 is the chime module. A tiny chime driver circuit board 214 is that used in "Radio Shack" brand model #273-071B. To increase sound volume level, a tiny "Cebek" brand model #E-13 (0.5 watt) amplifier 206 is used. Chime volume control knob 44 (above the rear cover on the back of the mixer) is connected to a 5 KΩ audio taper 45 with a 22 KΩ fixed resistor 43 in series for proper span and range of chime volume. Chime on/off switch 46 (to the left of chime volume control) disconnects the chime if the operator wishes only the "ready" light to indicate when a milkshake is done.

Chime speaker 68 is an 8 Ω mylar cone speaker that is impervious to moisture. Pleasant chime sound exits rear mixer cover 62 through sound holes opposite the speaker.

Chime module 66 contains a pair of electrolytic capacitors 210 (100 μF at 16 v) and 212 (1000 μF at 16 v) wired in parallel for a total capacitance of 1100 μF at 16 v. These electrolytic capacitors serve to keep a tiny SPDT—12 v DC relay 208 energized for about 1½ seconds—allowing a pleasing two-tone chime sound to be heard. These capacitors then become charged, and the relay coil de-energizes—disconnecting power to chime driver 214 and amplifier 206. This small circuit takes the place of a separate timer circuit board to disconnect the chime after two tones. If instead, the chime were allowed to keep sounding until the milkshake cup was removed from the mixer, operator and customer annoyance would result.

Positive and negative terminals of electrolytic capacitors 210 and 212 are shorted quickly through a 1 KΩ resistor 216, which is connected by relay contacts in mixer motor timer 70, when this timer relay de-energizes as the milkshake cup is removed from the mixer. The chime is instantly ready to sound again for the next automatic milkshake cycle.

Looking again at FIG. 3 and FIG. 11, lower left electronic module 70 is the mixer motor timer—"Cebek" brand I-36 delay on operate. This timer is set by a 500 KΩ scoop dial control potentiometer 192. A shielded wire 196 connects potentiometer 192 to the mixer motor timer, with the shield connected to ground—to avoid the 110 v AC mixer motor electrical noise interference from entering the timer circuitry. On the rear of mixer motor timer 70, is installed a 56 KΩ fixed resistor 194 and a 100 KΩ mini-potentiometer 195—both in series with scoop dial potentiometer 192. With this arrangement, the spread and span of scoop dial control knob 34 is correct to allow easy operator setting of the number of ice-cream scoops in the milkshake. The above-mentioned scoop dial settings for various sized milkshakes produce perfect, thick, well-mixed, consistent shakes that are not under or over-beaten. If at time of manufacture it should be desired to make all scoop dial positions increase or decrease in length of mixing time, merely adjusting mini-potentiometer 195 will accomplish this without the need of removing the mixer motor head from the mixer.

Lower right electronic module 72 is the automatic low to high-speed shift timer—also a "Cebek"1–36 delay on operate. This timer is always set on a 10 second delay; the mixer motor will always operate at low speed (about 10,000 rpm) for 10 seconds, and shift to high speed (about 17,000 rpm) for the remainder of mixing time, as dictated by setting of the scoop dial control on front of the mixer motor head. This is the anti-splash feature. The operator need not be concerned about forgetting to start mixing each shake on low speed in order to avoid milkshake from flying out of the mixer cup.

With the following design of the present invention, no power is in any way being consumed by this automatic mixer or its power supply—unless a milkshake is being mixed.

On an automatic triple milkshake mixer unit, three miniature cup rim switches are used on each of the three cup rim switch slide mechanisms—to allow one 12 v DC filtered, regulated power supply to provide power to all three sets of electronics. Conversely, for a single mixer unit, only one cup rim switch would be needed. This arrangement prevents unwanted feedback between the three units of a triple mixer. If three switches were not used, any time one mixer motor would operate, all three would operate, as would all three sets of electronics.

The power supply is an "Altronix" brand #AL624 filtered, regulated 12 v DC power supply 178 (with its 110 v AC to 16.5 v AC 20 VA supply adapter transformer) located inside the mixer between front stainless steel mixer backdrop 18, and rear unitized mixer backdrop 16. Only one standard power cord enters the mixer in normal fashion—all electrical connections are inside the mixer.

Top cup rim switch container guide 54 pushes up cup rim switch slide mechanism (not shown) when the milkshake cup is put on the mixer. See schematic FIG. 11 for the slide mechanism switches used on a triple mixer, as described in the following discussion.

Cup rim switch #1 (181) is a "Cherry" brand rolling subminiature microswitch #E62-10K that has a much higher amperage rating than needed for the load of mixer motor 190, cup rotation motor 74, and 12 v DC power supply 178. Cup rim switch #1 connects the hot (black) of 110 v AC to mixer motor 190, cup rotation motor 74, and neon "Ready" indicator light 42, as well as to cup rim switch #2 (182). Cup rim switches #2 (182) and #3 (183) are both "Cherry" brand rolling subminiature microswitches #E61-10K. Switch #2 connects hot (black) to the power supply, and switch #3 connects 12 v DC positive from the power supply to the electronics. All three sets of switch contacts close when the milkshake cup is put on the mixer. Mixer motor manual 3-speed rocker switch 30 switches neutral (white) 110 v AC to the low, medium, or high speed motor windings if "manual" momentary pushbutton 32 is pushed after a cup is put on the mixer. Fully automatic operation automatically returns for next milkshake, and neutral feed to rocker switch 30 is disconnected.

Conclusion, Ramifications, and Scope

The present invention of a fully automatic electronic milkshake mixer has many advantages which revolutionize milkshake mixing as compared to old-fashioned manual milkshake mixers.

This automatic electronic milkshake mixer: rotates the different standard sized mixer cups automatically—mixing faster and more completely, has an anti-splash automatic low to high speed shift feature, has a scoop dial knob to set automatic operation for the number of ice-cream scoops (or related products) in the shake, and has a "ready" indicator light and two-tone pleasing chime (with on/off and volume controls) to alert the operator that a shake is done. This mixer also has a "manual" momentary pushbutton—allowing manual control over mixer motor speed and length of milkshake mixing. During manual operation, cup still rotates automatically, and mixer automatically returns to automatic operation for next milkshake. The scoop dial is a continuous movement control—allowing smaller or larger scoops as indicated by dial markings.

This automatic electronic milkshake mixer also ensures quality control over milkshake thickness—meaning happier ice-cream parlor customers and home kitchen users. Poor, thin, watery milkshakes and the resulting irate customers are avoided. The amount of ice-cream used in milkshakes can be more uniform saving the soda fountain owner much money. Less electricity is used, and less mixer wear and tear occurs due to milkshakes being done faster. There is a huge labor savings; employees are free to help other customers while this mixer does the work automatically. Simply set the scoop dial for the number of scoops in the shake, put the mixer cup on the automatic mixer—and walk away. Commercial duty construction makes this automatic mixer perfect for commercial or home use.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. An automatic mixing machine for mixing beverages, said automatic mixing machine comprising:
   a) a support structure including a base and upwardly-extending wall members connected to the base, wherein the wall members carry an agitator drive housing positioned in spaced relationship to the base and from which at least one rotatable agitator member extends toward the base for agitating beverages, wherein the at least one agitator member is rotatable about an agitator axis of rotation;
   b) upper and lower container supports carried by the support structure for supporting a beverage container in a substantially upright position so that the agitator extends into the container, wherein the lower container support includes a container drive having at least one rotatable container drive wheel for engaging a container base, and wherein the at least one container drive wheel is rotatable about an axis of rotation that is disposed transversely relative to the agitator axis of rotation for rotating the container about its axis during a mixing operation; and
   c) drive means for rotating the at least one container drive wheel and for rotating the at least one agitator.

2. An automatic mixing machine in accordance with claim 1, wherein the at least one drive wheel has a substantially hourglass shape and includes a recessed inner peripheral region within which a container base rim is adapted to be received.

3. An automatic mixing machine in accordance with claim 2, wherein the at least one drive wheel is a unitary structure.

4. An automatic mixing machine in accordance with claim 2, wherein the at least one drive wheel includes an outer drive surface that is adapted to face an inner side of a container base rim and an inner drive surface adapted to face an outer side of a container base rim, and wherein the outer and inner drive surfaces are spaced from each other.

5. An automatic mixing machine in accordance with claim 4, wherein the drive surfaces are inclined at an acute angle to an axis about which the drive surfaces rotate.

6. An automatic mixing machine in accordance with claim 4, wherein the drive surfaces face each other.

7. An automatic mixing machine in accordance with claim 1, including a pair of rotatable, laterally-spaced drive wheels that are supported from the support structure, wherein the drive wheels are disposed so that they each contact a base of a container carried between the upper and lower container supports.

8. An automatic mixing machine in accordance with claim 1, including a container drive motor operatively connected with the at least one drive wheel for positively rotating the drive wheel.

9. An automatic mixing machine in accordance with claim 1, including a container upper rim guide member for contacting a container upper rim and for guiding rotational movement of the container upper rim as the container rotates about its axis of rotation during a mixing operation.

10. An automatic mixing machine in accordance with claim 9, wherein the upper rim guide member includes at least one rotatable guide wheel.

11. An automatic mixing machine in accordance with claim 10, wherein the at least one guide wheel has a substantially hourglass shape and includes a recessed inner annular region within which a container upper rim is adapted to be received.

12. An automatic mixing machine in accordance with claim 11, wherein the at least one guide wheel is a unitary structure.

13. An automatic mixing machine in accordance with claim 11, wherein the at least one guide wheel includes a first guide surface that is adapted to face an inner side of a container upper rim and a second guide surface that is adapted to face an outer side of a container upper rim.

14. An automatic mixing machine in accordance with claim 13, wherein the guide surfaces are inclined at an acute angle relative to an axis about which the at least one guide wheel rotates.

15. An automatic mixing machine in accordance with claim 14, wherein the guide surfaces face each other.

16. An automatic mixing machine in accordance with claim 9, including a pair of laterally-spaced guide wheels that are rotatably carried by and are supported from the upper rim guide member, wherein the guide wheels contact the container upper rim at angularly-spaced positions.

17. An automatic mixing machine in accordance with claim 16, wherein the guide wheels are rotatably carried on respective axes of rotation that are angularly disposed relative to each other.

18. An automatic mixing machine in accordance with claim 1, including a selector for manually providing user input information upon which agitator operating speeds and agitator operating times are based.

19. An automatic mixing machine in accordance with claim 18, wherein the user input information corresponds with a predetermined volume of semi-solid material to be mixed with a liquid material within the container during a mixing operation.

20. An automatic mixing machine in accordance with claim 1, including at least one indicator for providing a signal indicative of the completion of a mixing operation.

21. An automatic mixing machine in accordance with claim 20, wherein the signal is a visual signal provided by an indicator light.

22. An automatic mixing machine in accordance with claim 20, wherein the signal is an audible signal provided by a sound source.

23. An automatic mixing machine in accordance with claim 22, wherein the sound source is a chime.

24. An automatic mixing machine in accordance with claim 22, including a volume control for selectively varying the volume of the audible signal provided by the sound source.

25. An automatic mixing machine in accordance with claim 20, including two indicators for providing respective visual and audible signals.

26. An automatic mixing machine in accordance with claim 1, including means for automatically controlling agitator operating speed and operating time based upon an operator-provided volume of semi-solid material to be mixed with a liquid within the container during a mixing operation.

27. An automatic mixing machine in accordance with claim 26, including means for manually overriding the means for automatically controlling the agitator to enable selection by an operator of agitator operating speeds and operating times.

28. An automatic mixing machine in accordance with claim 1, said mixing machine including a user-operable selector for automatically selecting and setting predetermined mixing speeds and predetermined mixing times for mixing a beverage placed in the beverage container.

29. An automatic mixing machine in accordance with claim 28, wherein the selector is calibrated in increments representative of an amount of semi-solid, frozen material placed into the beverage container by the user.

30. An automatic mixing machine in accordance with claim 29, wherein the selector is a scoop dial having graduations corresponding to a number of ice-cream scoops placed in the beverage container by the user.

31. An automatic mixing machine in accordance with claim 30, wherein the scoop dial graduations include adjacent demarcations to allow for smaller and larger scoop volumes by incrementally reducing or increasing mixing times, respectively.

32. An automatic mixing machine in accordance with claim 30, wherein the scoop dial controls an automated mixing operation having predetermined mixing speeds and predetermined mixing times.

33. An automatic mixing machine in accordance with claim 28, including means responsive to the end of a predetermined mixing operation for automatically turning the mixing machine off.

34. An automatic mixing machine in accordance with claim 32, including means responsive to a scoop dial position for setting a first, slow mixing speed for a first mixing time, followed by a second, higher mixing speed for a second mixing time to avoid splashing of ingredients out of the beverage container during a mixing operation.

35. An automatic mixing machine in accordance with claim 34, wherein the duration of the first, slow mixing speed is the same for each position of the scoop dial.

36. An automatic mixing machine in accordance with claim 35, wherein at least one scoop dial position controls an automatic mixing operation having a single, predetermined mixing speed and a single, predetermined mixing time.

37. An automatic mixing machine in accordance with claim 32, including selector means for manually overriding automatic operation for allowing manual control over agitator operating speeds and mixing times.

38. An automatic mixing machine in accordance with claim 37, including reset means for returning automatically to automated operation for a next mixing operation after a manual override mixing operation.

39. An automatic mixing machine in accordance with claim 37, wherein the drive means for rotating the at least one container drive wheel is operative when the selector means for manually overriding automatic operation is activated to initiate manual control of agitator speed and mixing time.

40. An automatic mixing machine in accordance with claim 1, wherein the drive means includes a first drive motor operatively coupled with the agitator for rotating the agitator, and a second drive motor operatively coupled with the at least one container drive wheel for rotating the at least one container drive wheel.

41. An automatic mixing machine in accordance with claim 1, wherein the upper and lower container supports are arranged to receive and to rotatably support beverage containers having different volumetric capacities.

42. An automatic mixing machine in accordance with claim 1, wherein the upper and lower container supports are arranged to receive and to rotatably support beverage containers formed from different container materials.

43. An automatic mixing machine in accordance with claim 1, wherein the beverage includes an initially semi-solid, substantially frozen constituent and an initially liquid constituent to be mixed with the initially substantially frozen constituent.

44. An automatic mixing machine in accordance with claim 43, wherein the substantially frozen constituent is an ice-cream product and the liquid constituent is a milk product.

\* \* \* \* \*